May 21, 1940.   C. A. MINOR, JR   2,201,197
AUTOMOBILE GLARESHIELD CONSTRUCTION
Filed Jan. 11, 1938
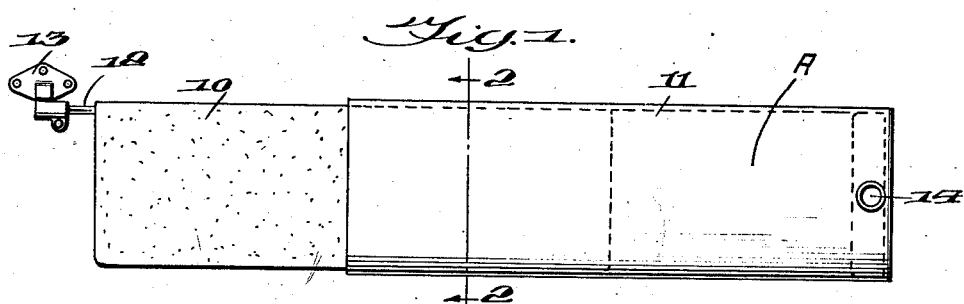
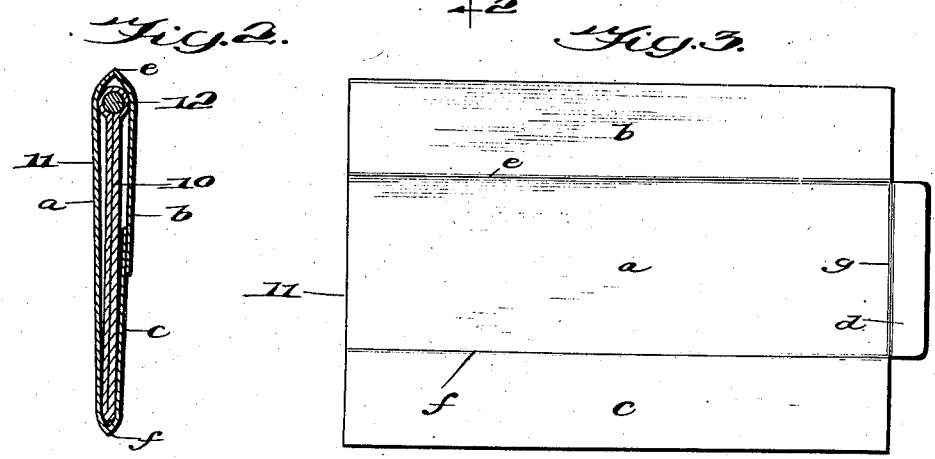
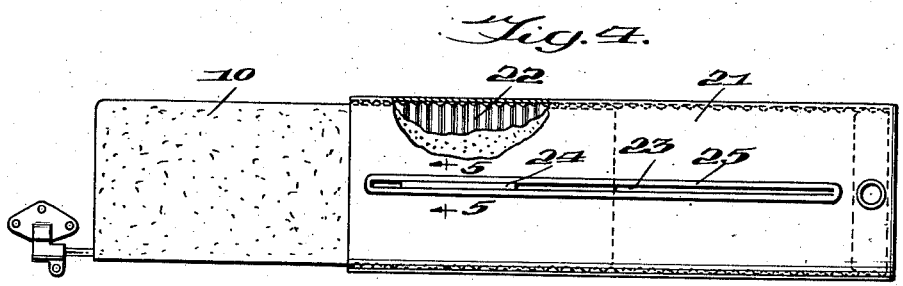
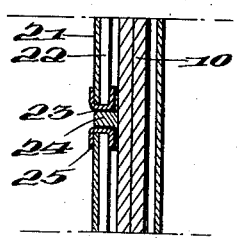
Inventor
C. A. Minor Jr.
By Edmund H. Parry Jr.
Attorney Patented May 21, 1940

2,201,197

UNITED STATES PATENT OFFICE 2,201,197

AUTOMOBILE GLARESHIELD CONSTRUCTION

Claude Albert Minor, Jr., San Antonio, Tex., assignor of one-half to Paul L. Meaders, San Antonio, Tex., and one-half to Lionel G. Anderson, Washington, D. C.

Application January 11, 1938, Serial No. 184,467

4 Claims. (Cl. 296—97)

This invention relates to glareshields designed to be swung over the windshield and/or side windows of an automobile and serving to protect the driver's eyes against glaring light from the sun or other sources.

Shields of this character are usually of limited dimensions considerably less than the length and height of the windshield, and desirably so, so as to blank out only a restricted area of the driver's vision, and at the same time facilitate adjustment of the shield from inoperative to operative position.

There are times when the angle at which glaring light reaches the automobile is such that the size of ordinary glareshields is inadequate. This insufficiency is overcome according to the present invention by providing for adjustment in size of a glareshield so that the shield may conform in dimensions to a conventional shield and when conditions make it desirable, it may be elongated and increased in effective area.

One object of the invention is to provide an adjustable glareshield comprising one panel of suitable size for average usage, and a second panel telescoping and slidably arranged in relation to the first panel. One member will be relatively thin and if desired may be constructed in the same manner as a conventional glareshield. The other member will be hollow and formed as a double walled structure having a narrow tubular cross section adapted to snugly fit over the first member. In the completely collapsed condition of the structure the latter member will constitute an envelope or case over the first member, and from the collapsed position one member may be adjusted lengthwise relative to the other to an extent sufficiently to materially increase the effective shield area. Only a single support is required. This will be secured to one of the panels which in turn will support the other panel for movement relative thereto. Either or both of the main and extension panels may be made of cardboard, fiber, metal or composition materials, and the same may be suitably covered with felt, fabricoid or other materials appropriate to the interior finish of automobiles.

The combination double panel unit may be made and sold as an extensible glareshield. However, the nature of the invention permits conventional single panel glareshields, such as supplied as original equipment on automobiles, to be converted into an extensible shield, and it is a particular object of the invention to provide a glareshield extension member, preferably in the form of a double walled hollow panel as above referred to, which may be applied to a conventional glareshield for the purpose of adjusting its effective shielding area. Since glareshields are of approximately the same dimensions on most makes of automobiles a single size extension member is capable of substantially universal adaptation.

It is a further object of the invention to provide a combination glareshield extension member and advertising display device, and to this end to provide an extension member having a suitable display face for printed advertising. The member may be made of cardboard or other cheap stiff and durable sheet material at relatively small cost so as to be applicable to conventional glareshields on automobiles. Because of the prominent location of a glareshield at the front of the automobile advertising displayed on the proposed glareshield extension can be observed by all occupants of the car. Since glareshields are arranged to be swung up and down, it may be desirable to provide advertising on both faces of the extension shield so that an advertisement will be displayed regardless of whether the assembled shield structure is in operative or inoperative position.

In addition to the features so far mentioned the invention also contemplates the provision of special means for guiding and supporting the relatively movable panels, and further means to cause one to grip the other so as to prevent accidental adjustment under the vibration experienced in automobiles.

The invention may be more fully understood by reference to the exemplary embodiments thereof shown in the accompanying drawing.

In such drawing:

Fig. 1 is a plan view of a simple form of the improved glareshield;

Fig. 2 is a sectional view somewhat enlarged, taken on the line 2—2 of Fig. 1;

Fig. 3 illustrates a blank such as may be employed in forming one of the panels shown in Figs. 1 and 2;

Fig. 4 is a view of a further form of the invention illustrating certain additional features, certain portions being broken away;

Fig. 5 is a section, substantially enlarged, taken on the line 5—5 of Fig. 4; and, Fig. 6 is a fragmentary longitudinal section illustrating the construction of certain parts shown in Figs. 4 and 5.

In the embodiments of Fig. 1 the extensible glareshield structure comprises two telescoping panels 10 and 11 of opaque material. Such panels are of approximately the same rectangular form and provide a structure which is extensible in a horizontal direction.

Panel 10 is here shown to be of one conventional design, being of flat form and constituted of a double thickness of suitable sheet material as indicated in Fig. 2. Supporting means for securing the glareshield in position above the windshield of an automobile here comprises a rod 12 encased in the long upper edge of panel 10 and having an end extension adjustable in a bracket member 13.

The second panel 11 which here constitutes the extension member is of hollow construction as indicated in Fig. 2. The same will be formed of stiff sheet material, and the same will constitute an envelope or casing telescoping over and adjustable lengthwise of panel 10.

Member 11 may be constructed from a single blank of sheet material, one form of which is indicated in Fig. 3. Such blank constitutes section a which will constitute one wall of the panel, complementary sections b and c which will be lapped and secured together in a joint so as to together form the second side of the panel, and preferably a flap d which will serve to close the outer end of the panel. The sections will be folded on lines e, f and g so as to provide creased edges with the view that the completed panel will have a substantially flat form. When the open end of panel 11 is inserted over panel 10, and the parts are brought into telescopic relation, there will be a slight distortion of panel 11 adjacent its folded edges e and f by reason of the fact that panel 10 has appreciable thickness. It is possible, of course, to provide panel 11 with spacing walls along its edges conforming to the thickness of panel 10, but the arrangement just referred to serves the function of causing envelope 11 to resiliently grip panel 10, producing a nice fit and resisting undesired sliding movement between the parts.

Either or both panels 10 and 11 may be constructed of stiff resilient paperboard, fiber, metal etc., and these may or may not be provided with a surface covering appropriate to the interior finish of an automobile. Where as above suggested panel 11 is to be employed for advertising purposes, the same will preferably be constructed of stiff, heavy paper or cardboard and provided with a suitable display face A on one or both sides thereof for the reception of printed advertising. While it may ordinarily be desirable to employ a relatively dark color for both panels for advertising purposes it may be desirable to make panel 11 of a relatively light color so that an advertising display in a contrasting color may be readily observed by the occupants of an automobile. It will be understood, of course, that in view of the simplicity in the construction of panel 11 the same may be manufactured at relatively small cost and distributed for use in automobiles already equipped with a glareshield of the character of panel 10.

In the embodiment of the invention illustrated in Fig. 4 the panel 10 has the same construction as before, and the panel 21 is of similar design to the panel 11. In the present embodiment, however, certain additional features are illustrated. In the present case one of the panels is formed with a frictional innerface adapted to grip the surface of panel 10 so as to resist longitudinal movement between the panels under the vibration experienced in an automobile. Frictional engagement is obtained by employing in panel 21 corrugated board of the form shown in Fig. 6, having corrugations 22 on its innerface, such corrugations extending vertically in a direction at right angles to the lengthwise telescopic movement of panels 10 and 21.

To facilitate sliding movement between the parts and to lend support against sagging of panel 21 when the same is in extended position, a guiding and supporting arrangement may be employed comprising a guide channel 23 extending lengthwise of the face of panel 21 which slidably receives rib 24 fixed to panel 10, all as most clearly illustrated in Fig. 5. To reinforce the slot a U-shaped metal edging 25 may be crimped around the edges of the slot. Besides guiding and supporting panel 21 the slot and rib arrangement serves the further function of providing a stop for limiting the outward movement of panel 21, it being evident that when panel 21 is pulled outwardly the end of rib 24 will engage the end of slot 23.

To facilitate adjustment of the tubular panel on the stationary panel, suitable means may be provided for grasping the extensible member. Such means may comprise a tab or handle. In the simple embodiment of the invention, particularly where it is desirable to keep down manufacturing costs, a convenient arrangement may comprise openings 14 as illustrated in Fig. 1 provided in the outer end of one or both sides of the hollow panel in which the fingers may be inserted.

The telescopic panel arrangement of the invention provides an effective means for increasing the shielding area of a glareshield. Because of the simplicity of construction the invention can be made at extremely low cost. Besides serving its primary function it may, as indicated, be embodied in a form suitable for advertising purposes.

What I claim is:

1. In or for a glareshield for automobiles a glareshield extension member adapted to increase the effective area of the glareshield comprising an opaque envelope of sheet material having closed opposing side edges and being open at one end to telescopically receive the glareshield, said envelope having corrugations extending crosswise of its inner face perpendicularly to the closed opposing edges adapted to engage the glareshield and resist relative movement between the glareshield and the extension panel.

2. An extensible glareshield comprising an opaque rectangular inner panel, a horizontally extending supporting rod secured to the inner panel adjacent its long upper edge and projecting beyond one end thereof, and a hollow outer opaque rectangular panel of narrow tubular cross section comprising a pair of laterally expansible side walls of resilient sheet material meeting each other in creased side edges and open at one end telescoping on the first panel and being slidable horizontally thereon lengthwise of the supporting rod.

3. In or for an automobile glareshield, a glareshield extension member comprising a pair of opposing flat side walls of flexible sheet material meeting and joining each other in creased, opposing side edges, and being open at one end for telescoping over a glareshield, said side walls being bendable to conform themselves to the thickness and contour of a glareshield.

4. In or for an automobile glareshield, a glareshield extension member comprising a paperboard blank creased and folded along spaced parallel lines and defining a double-walled flat envelope having closed opposing edges defined by said fold lines, said envelope being open at one end and being laterally bendable to telescopically receive a glareshield.

CLAUDE ALBERT MINOR, Jr.